June 19, 1923.
E. BUGATTI
1,459,193
VALVE MECHANISM
Filed Oct. 27, 1920
3 Sheets-Sheet 3
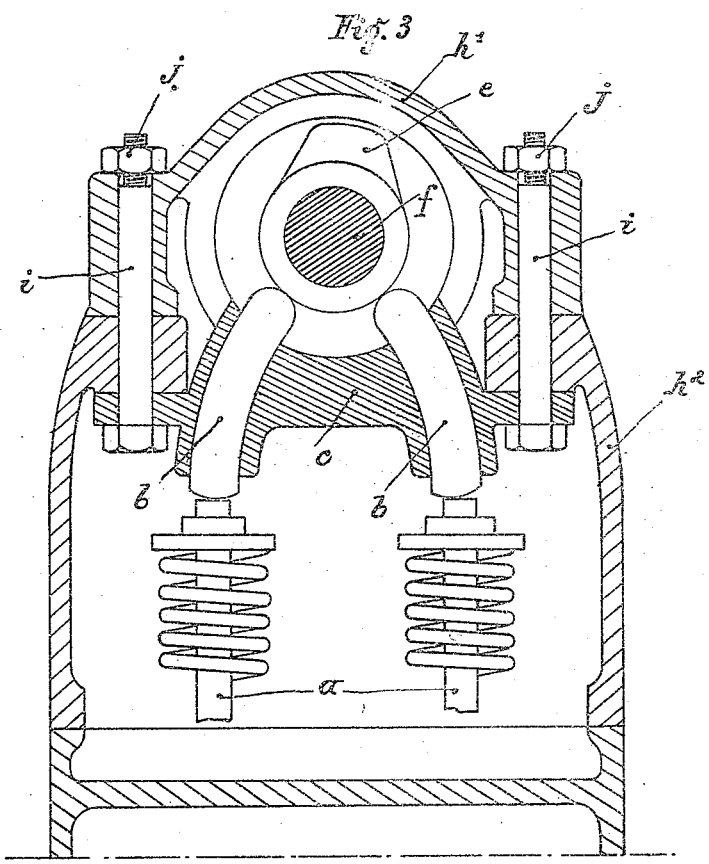

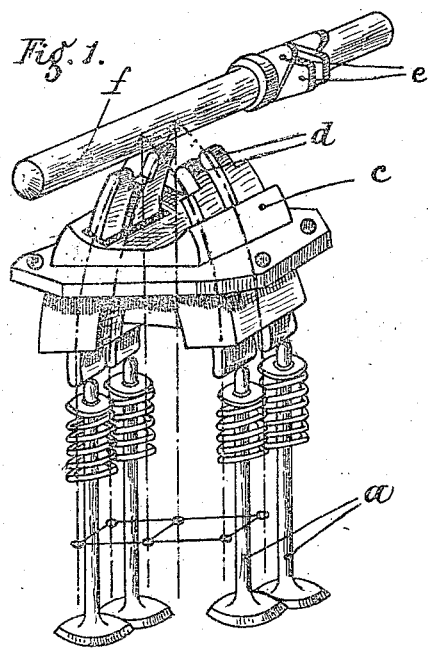

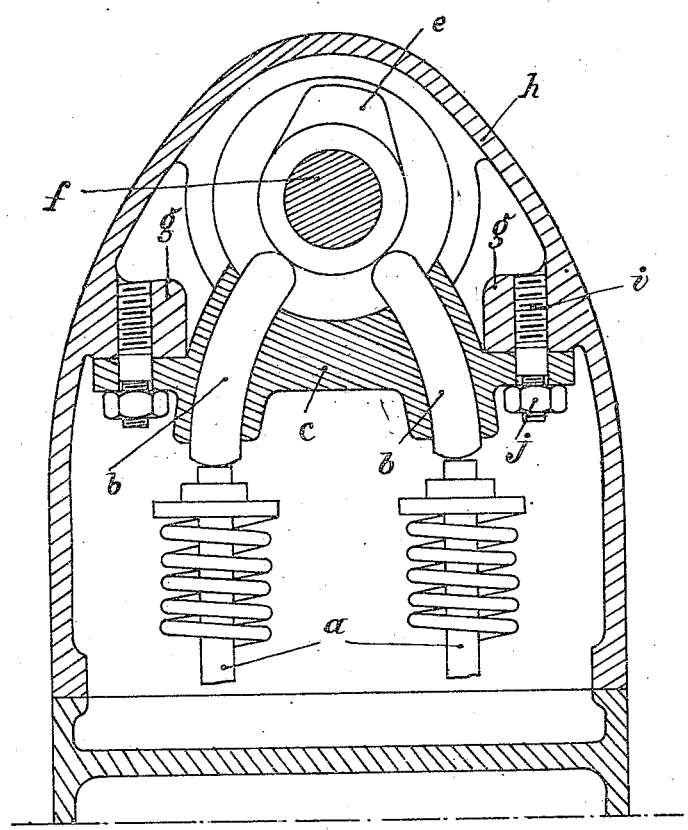

Patented June 19, 1923.

1,459,193

UNITED STATES PATENT OFFICE.

ETTORE BUGATTI, OF MOLSHEIM, FRANCE.

VALVE MECHANISM.

Application filed October 27, 1920. Serial No. 419,944.

*To all whom it may concern:*

Be it known that I, ETTORE BUGATTI, a subject of the King of Italy, residing at Molsheim, Alsace, in the Republic of France, have invented certain new and useful Improvements in Valve Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object improvements which are applicable to pitmen of distributing valves of internal combustion engines and of valves, which though parallel are not in the same plane as the axis of the cam shaft, being operated without the use of levers, trippers or other devices.

The invention has the advantage of providing an absolutely direct control by means of suitably curved members which are of small size as compared with what exists in cases where the control is effected by means of levers or trippers, which are often of very great weight.

A further improvement included in the invention consists in the arrangement of four pitmen in a common guide constituting a single removable support which is housed in a casing which comprises one, two or more pieces connected together, and is of the kind described in French Patent No. 443,693. The guide which is common to four pitmen is bolted or screwed in a removable manner to the said casing, so as to permit the ready dismantlement of the distributing parts.

The description which follows with respect to the accompanying drawing, which is given by way of example, will explain how the invention is carried out.

Fig. 1 is a perspective view of a detail showing four valves arranged according to the invention and mounted in a common guide, the cam shaft being slightly displaced in order to show the want of coaxial relation between the valves and the said shaft.

Fig. 2 is a vertical section of a casing in which are housed pitmen and a guide arranged according to Fig. 1, the casing consisting of a single member.

Fig. 3 is a modification of the construction in Fig. 2 the casing consisting of two parts.

The four valve stems $a$ are operated by the pitmen $b$ which are arcuate of curved form and adapted to be displaced in the correspondingly shaped seatings in the common guide $c$. The ends or heads $d$ of the pitmen are actuated in the usual manner by cams $e$ on the distributing shaft $f$. The piece constituting the common guide $c$ for the four pitmen is, by means of bolts or screws $i$ and nuts $j$, secured direct to lugs $g$ on the interior of the casing $h$ in the case where this latter is formed in a single piece. If the casing comprises a cover $h'$ and a base piece $h^2$, as shown in Fig. 3, the bolts or fixing rods $i$ provided with the nuts $j$ can be fixed in position at the same time that the guide $c$ the base piece $h^2$ and the cover $h'$ are assembled together.

The mode of mounting the parts which has been described allows, on the nuts $j$ (Figs. 2 and 3) being unscrewed, the removal through the base of the guide $c$ of the pitmen $b$ so that the parts for controlling the valves can be easily changed.

I claim:—

1. Valve control for internal combustion engines comprising a cam shaft, a solid member having guides formed therein, a curved tappet slidable in each of said guides and co-operating with the end of the respective valve stem, whereby the cam shaft is enabled to control the valves which are co-axial with the said curved tappets.

2. Valve control for internal combustion engines, comprising a housing forming a casing, a cam shaft disposed in said housing, a solid member having guides formed therein, a curved tappet slidable in each of said guides and co-operating with the end of the respective valve stem, and means for securing the solid member containing said tappet to the housing, whereby the said solid member can be dismounted without interfering with the cam shaft.

In testimony whereof I have signed this specification in the presence of two subscribing witnesses.

ETTORE BUGATTI.

Witnesses:
D. C. WOODS,
PAUL S. LONGAKFALL.